US009841495B2

(12) United States Patent
Campbell et al.

(10) Patent No.: US 9,841,495 B2
(45) Date of Patent: Dec. 12, 2017

(54) LIDAR SYSTEM WITH IMPROVED SCANNING SPEED FOR HIGH-RESOLUTION DEPTH MAPPING

(71) Applicant: Luminar Technologies, Inc, Orlando, FL (US)

(72) Inventors: Scott R. Campbell, Sanford, FL (US); Jason M. Eichenholz, Orlando, FL (US); Lane A. Martin, Sunnyvale, CA (US); Matthew D. Weed, Winter Park, FL (US)

(73) Assignee: Luminar Technologies, Inc., Portola Valley, CA (US)

( * ) Notice: Subject to any disclaimer, the term of this patent is extended or adjusted under 35 U.S.C. 154(b) by 0 days.

(21) Appl. No.: 15/342,595

(22) Filed: Nov. 3, 2016

(65) Prior Publication Data

US 2017/0131387 A1 May 11, 2017

Related U.S. Application Data

(60) Provisional application No. 62/251,672, filed on Nov. 5, 2015.

(51) Int. Cl.
*G01C 3/08* (2006.01)
*G01S 7/481* (2006.01)
*G01S 17/10* (2006.01)

(52) U.S. Cl.
CPC .......... *G01S 7/4817* (2013.01); *G01S 7/4812* (2013.01); *G01S 7/4816* (2013.01); *G01S 17/10* (2013.01)

(58) Field of Classification Search
CPC ....... G01S 7/4817; G01S 7/4812; G01S 17/10
See application file for complete search history.

(56) References Cited

U.S. PATENT DOCUMENTS

| 5,006,721 A | 4/1991 | Cameron et al. |
| 5,198,657 A | 3/1993 | Trost et al. |
| 5,696,778 A | 2/1997 | MacPherson |

(Continued)

FOREIGN PATENT DOCUMENTS

| WO | WO 2017/079483 | 5/2017 |
| WO | WO 2017/095817 | 6/2017 |

OTHER PUBLICATIONS

U.S. Appl. No. 15/180,580, filed Jun. 13, 2016, Hall.

(Continued)

*Primary Examiner* — Samantha K Abraham
(74) *Attorney, Agent, or Firm* — Knobbe, Martens, Olson & Bear, LLP

(57) ABSTRACT

A lidar system may have a light source configured to emit a pulse of light and a scanner that scans a field of view of the light source in a forward-scanning direction across a plurality of pixels located downrange from the lidar system. The scanner can direct the pulse of light toward the second pixel and scan a field of view of a first detector. The first-detector field of view can be offset from the light-source field of view in a direction opposite the forward-scanning direction. When the pulse is emitted, the first-detector field of view can at least partially overlap the first pixel and the light-source field of view can at least partially overlap the second pixel. The first detector can be configured to detect a portion of the pulse of light scattered by a target located at least partially within the second pixel.

20 Claims, 8 Drawing Sheets

(56) References Cited

U.S. PATENT DOCUMENTS

| | | |
|---|---|---|
| 5,867,305 A | 2/1999 | Waarts et al. |
| 5,872,621 A | 2/1999 | Wilkerson et al. |
| 5,892,575 A | 4/1999 | Marino |
| 6,449,384 B2 | 9/2002 | Laumeyer et al. |
| 6,710,324 B2 | 3/2004 | Hipp |
| 6,723,975 B2 | 4/2004 | Saccomanno |
| 6,747,747 B2 | 6/2004 | Hipp |
| 6,759,649 B2 | 7/2004 | Hipp |
| 7,092,548 B2 | 8/2006 | Laumeyer et al. |
| 7,209,221 B2 | 4/2007 | Breed et al. |
| 7,345,271 B2 | 3/2008 | Boehlau et al. |
| 7,433,903 B1 | 10/2008 | Shapiro et al. |
| 7,443,903 B2 | 10/2008 | Leonardo et al. |
| 7,532,311 B2 | 5/2009 | Henderson et al. |
| 7,570,793 B2 | 8/2009 | Lages et al. |
| 7,583,364 B1 | 9/2009 | Mayor et al. |
| 7,649,920 B2 | 1/2010 | Welford |
| 7,652,752 B2 | 1/2010 | Fetzer et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,541,744 B1 | 9/2013 | Liu |
| 8,548,014 B2 | 10/2013 | Fermann et al. |
| 8,625,080 B2 | 1/2014 | Heizmann et al. |
| 8,675,181 B2 | 3/2014 | Hall |
| 8,723,955 B2 | 5/2014 | Kiehn et al. |
| 8,767,190 B2 | 7/2014 | Hall |
| 8,796,604 B2 | 8/2014 | Lynass et al. |
| 8,804,787 B1 | 8/2014 | Coleman et al. |
| 8,817,096 B1 | 8/2014 | Ni et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | D'Aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jachman et al. |
| 9,383,445 B2 | 7/2016 | Lu et al. |
| 9,383,753 B1 | 7/2016 | Templeton et al. |
| 2002/0041435 A1 | 4/2002 | Krummrich |
| 2002/0060784 A1 | 5/2002 | Pack et al. |
| 2003/0043058 A1 | 3/2003 | Jamieson et al. |
| 2005/0214690 A1 | 9/2005 | Verheijden et al. |
| 2006/0227316 A1 | 10/2006 | Gatt |
| 2006/0231771 A1 | 10/2006 | Lee et al. |
| 2006/0290920 A1 | 12/2006 | Kämpchen et al. |
| 2007/0040121 A1 | 2/2007 | Kalayeh |
| 2007/0182949 A1 | 8/2007 | Niclass |
| 2007/0247612 A1 | 10/2007 | Pack et al. |
| 2008/0027591 A1 | 1/2008 | Lenser et al. |
| 2008/0074640 A1 | 3/2008 | Walsh et al. |
| 2008/0181266 A1 | 7/2008 | Deladurantaye et al. |
| 2008/0309913 A1 | 12/2008 | Fallon |
| 2009/0122295 A1 | 5/2009 | Eaton |
| 2009/0262760 A1 | 10/2009 | Krupkin et al. |
| 2009/0273770 A1 | 11/2009 | Bauhahn et al. |
| 2010/0034221 A1 | 2/2010 | Dragic |
| 2010/0091263 A1 | 4/2010 | Kumagai et al. |
| 2010/0128744 A1 | 5/2010 | Deladurantaye et al. |
| 2011/0085149 A1 | 4/2011 | Nathan |
| 2011/0122012 A1 | 5/2011 | Van Zeijl et al. |
| 2012/0038903 A1 | 2/2012 | Weimer et al. |
| 2012/0168605 A1 | 7/2012 | Milanovic |
| 2012/0206712 A1 | 8/2012 | Chang et al. |
| 2012/0227263 A1 | 9/2012 | Leclair et al. |
| 2012/0268105 A1 | 10/2012 | Mann et al. |
| 2013/0010820 A1 | 1/2013 | Curtis |
| 2013/0033742 A1 | 2/2013 | Rogers et al. |
| 2013/0282208 A1 | 10/2013 | Mendez-Rodriguez et al. |
| 2014/0111805 A1 | 4/2014 | Albert et al. |
| 2014/0146303 A1 | 5/2014 | Mitchell et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0268098 A1 | 9/2014 | Schwartz |
| 2014/0268311 A1 | 9/2014 | Zhu |
| 2014/0293263 A1 | 10/2014 | Justice et al. |
| 2014/0293266 A1 | 10/2014 | Hsu et al. |
| 2014/0330479 A1 | 11/2014 | Dolgov |
| 2014/0376001 A1 | 12/2014 | Swanson |
| 2015/0109605 A1 | 4/2015 | Major, Jr. et al. |
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1 | 7/2015 | Zhu |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0219765 A1 | 8/2015 | Mead et al. |
| 2015/0301182 A1 | 10/2015 | Geiger et al. |
| 2015/0316415 A1 | 11/2015 | Islam |
| 2015/0323654 A1 | 11/2015 | Jachmann et al. |
| 2015/0378023 A1 | 12/2015 | Royo et al. |
| 2015/0378241 A1 | 12/2015 | Eldada |
| 2016/0025842 A1 | 1/2016 | Anderson et al. |
| 2016/0041266 A1* | 2/2016 | Smits .................... G01S 17/66 356/5.01 |
| 2016/0047896 A1 | 2/2016 | Dussan |
| 2016/0047901 A1 | 2/2016 | Pacala et al. |
| 2016/0049765 A1 | 2/2016 | Eldada |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0245919 A1 | 8/2016 | Kalscheur et al. |
| 2017/0131388 A1 | 5/2017 | Campbell et al. |

OTHER PUBLICATIONS

Search Report and Written Opinion mailed Feb. 1, 2017 in corresponding PCT Application No. PCT/US16/60397, 9 pgs.
Search Report and Written Opinion in corresponding PCT Application No. PCT/US2016/064020 dated Apr. 4, 2017, 37 pgs.
Office Action dated Jul. 13, 2017 in U.S. Appl. No. 15/470,718, 17 pgs.

(56) References Cited

OTHER PUBLICATIONS

Office Action dated Aug. 14, 2017 in U.S. Appl. No. 15/470,708, 15 pgs.

* cited by examiner

LIDAR SYSTEM WITH IMPROVED SCANNING SPEED FOR HIGH-RESOLUTION DEPTH MAPPING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims priority to U.S. Provisional Patent Application No. 62/251,672, filed Nov. 5, 2015, and entitled "LIDAR SYSTEM WITH IMPROVED SCANNING SPEED FOR HIGH-RESOLUTION DEPTH MAPPING," the entirety of which is hereby incorporated by reference herein.

BACKGROUND OF THE INVENTION

Field of the Invention

This disclosure relates to scanning lidar systems for creating a depth map of a field of regard.

Description of the Related Art

Lidar is a technology that can be used to measure distances to remote targets. Typically, a lidar system includes a light source and a detector. The light source emits light pulses toward a target which then scatters the light. Some of the scattered light is received back at the detector. The system determines the distance to the target based on one or more characteristics associated with the returned light pulses. For example, the system may determine the distance to the target based on the time of flight of a returned light pulse.

SUMMARY

In some embodiments, a lidar system comprises: a light source configured to emit a pulse of light; a scanner configured to: scan a field of view of the light source in a forward-scanning direction across a plurality of pixels located downrange from the lidar system, wherein the plurality of pixels comprises a first pixel and a second pixel, wherein the second pixel is located adjacent to the first pixel along the forward-scanning direction; direct the pulse of light toward the second pixel; and scan a field of view of a first detector of the lidar system, wherein: the first-detector field of view is scanned in the forward-scanning direction across the plurality of pixels; and the first-detector field of view is offset from the light-source field of view in a direction opposite the forward-scanning direction, wherein, when the pulse is emitted: the first-detector field of view at least partially overlaps the first pixel; and the light-source field of view at least partially overlaps the second pixel; and the first detector, wherein the first detector is configured to detect a portion of the pulse of light scattered by a target located at least partially within the second pixel.

In some embodiments, a method comprises: emitting, by a light source of a lidar system, a pulse of light; scanning a field of view of the light source in a forward-scanning direction across a plurality of pixels located downrange from the lidar system, wherein the plurality of pixels comprises a first pixel and a second pixel, wherein the second pixel is located adjacent to the first pixel along the forward-scanning direction; directing the pulse of light toward the second pixel; scanning a field of view of a first detector of the lidar system, wherein: the first-detector field of view is scanned in the forward-scanning direction across the plurality of pixels; and the first-detector field of view is offset from the light-source field of view in a direction opposite the forward-scanning direction, wherein, when the pulse is emitted: the first-detector field of view at least partially overlaps the first pixel; and the light-source field of view at least partially overlaps the second pixel; and detecting a portion of the pulse of light scattered by a target located at least partially within the second pixel.

DETAILED DESCRIPTION

Lidar systems can be used to determine the distance to a downrange target. By scanning the lidar system across a field of regard, the system can be used to map the distance to a number of points within the field of regard. Each of these points can be referred to as a pixel. It is often desirable that the depth-mapped points within the field of regard be as closely spaced as possible in order to achieve a high resolution depth map of the field of regard. In addition, it is often desirable that the scan time required to create the depth map be as short as possible. For example, it may be desirable to repeatedly complete depth maps of the field of regard at frame rates fast enough to support a depth map video (e.g., 30 frames per second). This disclosure describes a lidar system 100 which is capable of achieving relatively high resolution depth maps at video frame rates.

Figure 1:
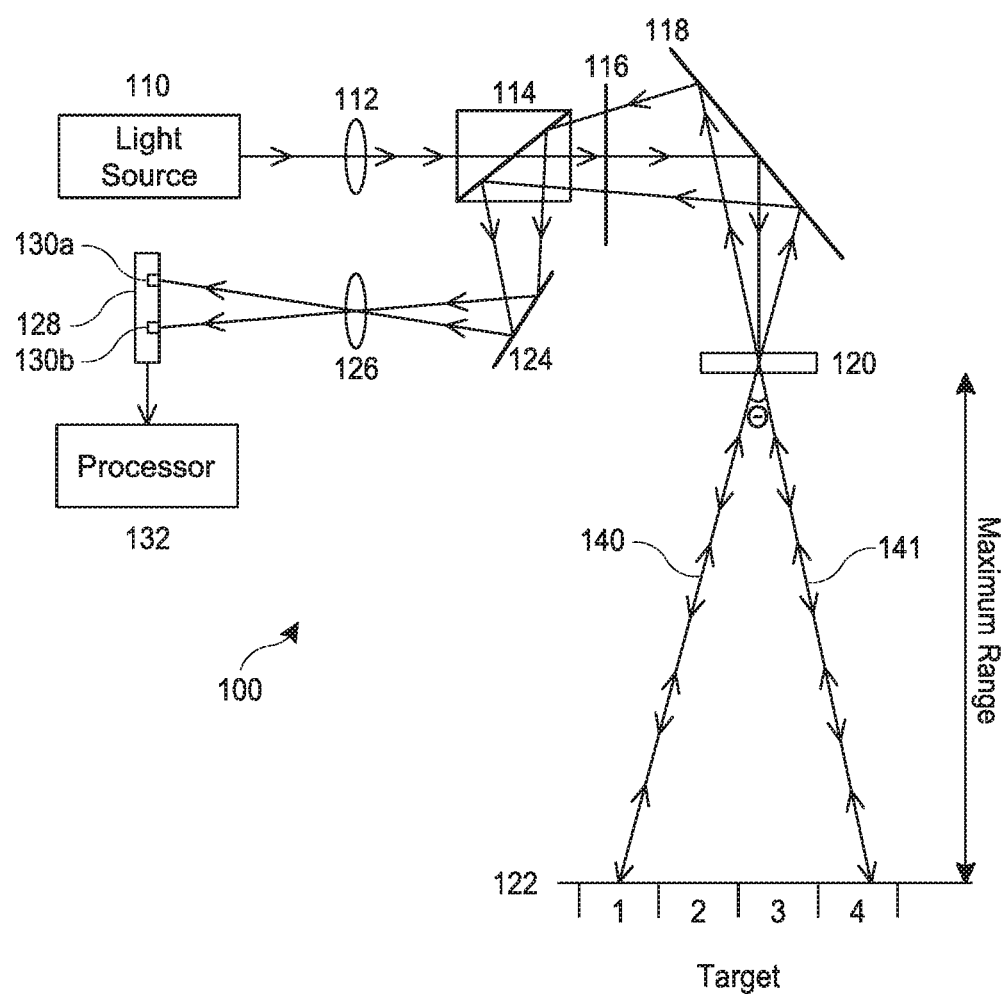
FIG. 1 illustrates a lidar system 100 capable of improved scanning speed for high-resolution depth mapping.

FIG. 1 illustrates a lidar system 100 capable of improved scanning speed for high-resolution depth mapping. The lidar system 100 includes a light source 110. The light source can be, for example, a pulsed laser. The light source 110 emits a pulse of light which propagates toward a collimating lens 112. After passing through the collimating lens 112, the pulse of light is transmitted directly through a beam splitter 114 toward a quarter wave plate 116. The pulse of light then reflects from a scanner 118. The scanner 118 can be, for example, a scanning mirror 118 that rotates around at least one axis in order to direct light pulses across the field of regard. As an example, the scanner 118 can include a galvanometer scanner, a resonant scanner, a voice coil motor, a DC motor, a stepper motor, or a microelectromechanical systems (MEMS) device. In some embodiments, instead of a beam splitter 114 and quarter wave plate 116, the lidar system 100 may include a mirror configured so that a pulse of light emitted by the light source 110 passes through the mirror. As an example, the mirror may include a hole, slot, or other aperture that the pulse of light passes through as it travels to the scanning mirror 118. Light that is scattered by the target 122 may propagate back toward the lidar system, and the mirror may reflect this return light toward mirror 124 which then directs the light toward detector lens 126. Other physical layouts and combinations of optical elements can also be used.

After reflecting from the scanner 118, the pulse of light is incident upon a holographic element, pixelator, diffractive element, or similar device 120. The holographic element or pixelator 120 splits the pulse of light into two pulses which now travel along separate angularly-separated paths 140, 141. The two pulses of light propagate downrange from the lidar system 100 toward a target 122. In FIG. 1, the target 122 is illustrated as being located at the maximum range of the lidar system 100.

In some embodiments, the angular separation θ imparted by the holographic element or pixelator 120 is such that the distance between the two light pulses at the maximum range of the lidar system corresponds to the width of multiple pixels. For example, the holographic element or pixelator can be designed such that the separation between the two light pulses at the maximum range corresponds to an odd number of pixels greater than or equal to three pixels (e.g., 3, 5, 7, 9, etc.). (The significance of this particular spacing is described below.) In FIG. 1, four pixels are labeled on the target 122. One of the light pulses is directed to the first pixel, while the other light pulse is directed to the fourth pixel. Thus, the spacing between the light pulses is three pixels in this embodiment.

The light pulses scatter from the target 122 and a portion of each pulse propagates back toward the lidar system along reciprocal paths 140, 141. Each return light pulse is reflected by the scanner 118, which has since rotated slightly from its position when the pulses were transmitted, toward the quarter wave plate 116. After passing through the quarter wave plate 116, the return light pulses are reflected by the beam splitter 114 toward a mirror 124. (Although FIG. 1 illustrates that the light source 110 and the detector array 128 share an aperture via the beam splitter 114, other embodiments are possible without a shared aperture.) The mirror 124 reflects the return light pulses toward a detector lens 126, the detector lens 126 focuses the return light pulses on a detector array 128 located at the focal plane of the lens 126. As discussed further herein, the detector focal plane array 128 includes at least two spatially-separated detectors 130a, 130b. The separation between the two detectors 130a, 130b is in the scanning dimension of the lidar system 100. As shown in FIG. 1, the return light pulse from pixel #1 is focused on the first detector 130a, while the return light pulse from pixel #4 is focused on the second detector 130b. Thus, the separation between the two detectors 130a, 130b corresponds to the spacing between the light pulses at the maximum range of the lidar system 100. Consequently, the separation between the detectors 130a, 130b likewise corresponds to the spacing between an odd number of pixels greater than or equal to three. (Once again, the significance of this spacing is discussed below.)

The detectors 130a, 130b create electrical signals which are indicative of the return light pulses. The electrical signals are fed to a processor 132 which then determines the distance to the target 122 based on, for example, the time of flight of the light pulses. This process is repeated as the scanner 118 traverses the field of regard in order to create a depth map of the scene. The processor 132 can also be used to control the timing of light pulses from the light source 110 and other functions of the lidar system 100.

Figure 2:
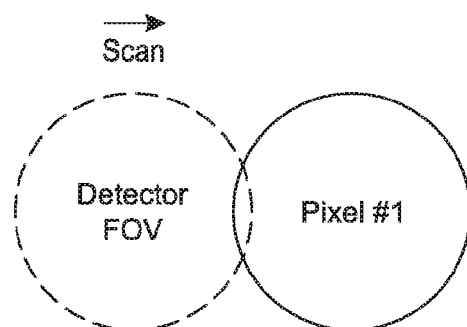
FIG. 2 illustrates the spatial relationship between a downrange pixel and the field of view of the first detector 130a at a scan time which corresponds to a close range target in pixel #1.

FIG. 2 illustrates the spatial relationship between a downrange pixel and the field of view of the first detector 130a at a scan time which corresponds to a close range target in pixel #1. The size of the pixel depends on the size of the angular field of view of the light source 110 and the distance to the downrange target 122. In some embodiments, the light source 110 has an angular field of view on the order of milliradians, though it could be larger or smaller depending upon the application. In some embodiments, the angular field of view of each detector 130a, 130b is substantially equal to that of the light source 110, though this is not necessarily required. As illustrated, though, in FIG. 2, the pixel and the detector field of view have the same size.

The lidar system 100 is designed such that each detector 130a, 130b is aligned with a downrange pixel that is respectively offset from one of the downrange pixels with which the light source 110 is aligned (the light source 110 is aligned with two downrange pixels simultaneously because of the pixelator 120). For example, in some embodiments, the detectors 130a, 130b are aimed at the two pixels directly adjacent (in the direction opposite the scanning direction) to the respective downrange pixels with which the light source is aligned.

With reference to FIG. 2, the light source 110 emits a pulse of light at a time $t_1$ when the scanner 118 is positioned so as to direct the first pulse toward pixel #1 (and the second pulse toward pixel #4). The scanner 118 continues to scan (left to right) to the next pixel after the pulse of light is emitted (and subsequently split into two pulses). Because the field of view of the first detector 130a is offset from that of the light source in the direction opposite the scanning direction, the field of view of the first detector 130a does not align with pixel #1 until a subsequent time after $t_1$.

In FIG. 2, a relatively short period of time has passed since the light pulse was emitted. Therefore, the field of view of the detector 130a slightly overlaps pixel #1. If a return pulse were received by the detector 130a at the time illustrated in FIG. 2, then the processor 132 would register detection of a close range target 122 owing to the short elapsed time of flight. Although the detector field of view only partially overlaps with pixel #1 in the case of a close range target, the return pulse is still strong enough to be detected because the $1/r^2$ signal loss is small owing to the relatively close range of the target.

Figure 3:
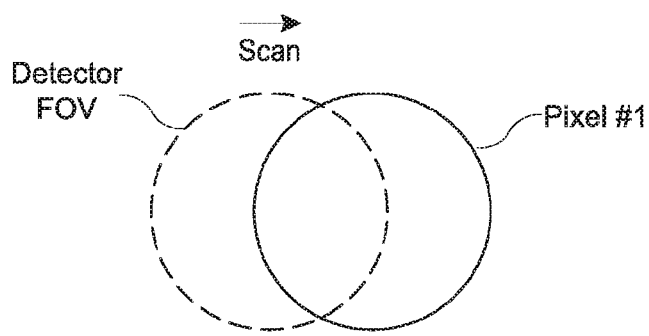
FIG. 3 illustrates the spatial relationship between a downrange pixel and the field of view of the first detector 130a at a scan time which corresponds to a midrange target in pixel #1.

FIG. 3 illustrates the spatial relationship between a downrange pixel and the field of view of the first detector 130a at a scan time which corresponds to a midrange target in pixel #1. At this scan time, the field of view of the detector 130*a* overlaps pixel #1 by a greater amount than was the case for the short-range target in FIG. 2. This is due to the greater elapsed scanning time since $t_1$. Because of the greater overlap between the field of view of the detector 130*a* and pixel #1, the greater $1/r^2$ signal loss resulting from a more distant target is at least partially offset. The detector 130*a* is therefore able to detect the return pulse from the midrange target.

Figure 4:
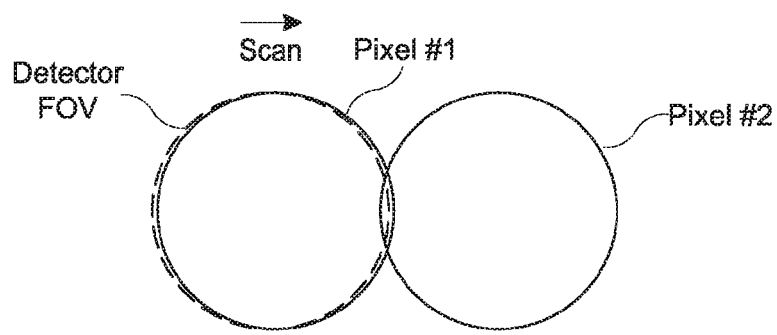
FIG. 4 illustrates the spatial relationship between a downrange pixel and the field of view of the first detector 130a at a scan time which corresponds to a maximum range target in pixel #1.

FIG. 4 illustrates the spatial relationship between a downrange pixel and the field of view of the first detector 130*a* at a scan time which corresponds to a maximum range target in pixel #1. As illustrated by FIG. 4, the scanning speed of the scanner 118 can be set such that the field of view of the first detector 130*a* substantially completely overlaps pixel #1 at a scan time which corresponds to the round-trip time for a target 122 located at the maximum range of the lidar system 100. (In other words, in the case of the illustrated example, the time required for the scanner to move the width of one pixel is about the same as the round trip time for the maximum range of the system 100; the time to completely traverse one pixel from one side to the other is about 2× the round trip time for the maximum range.) It is advantageous for the field of view of the detector to substantially completely overlap pixel #1 for a maximum range target in order to at least partially offset the greater $1/r^2$ signal loss which results from the round-trip propagation distance associated with the maximum range of the lidar system.

A comparison of FIG. 4 with FIG. 2 reveals that, at a scan time corresponding to a maximum range target for pixel #1, the detector field of view is in the same position relative to pixel #2 as it was relative to pixel #1 when the scan of pixel #1 began. This might suggest that the detector can begin scanning pixel #2 at this time. The problem with doing so, however, is that a target located in pixel #1 just beyond the maximum range of the lidar system 100 could be confused for a short-range target located in pixel #2. One way to avoid this ambiguity would be to pause or reduce the scanning speed of the scanner 118. Another way to avoid the ambiguity would be to decrease the scanning resolution. However, neither of these solutions is particularly desirable. The lidar system 100 illustrated in FIG. 1 instead uses a better solution.

As shown in FIG. 1, the detector array 128 includes two spatially-separated detectors 130*a*, 130*b*. And, as already discussed, the two detectors 130*a*, 130*b* are offset from one another in the scanning direction by a distance which corresponds to an odd number of pixels greater than or equal to three. Specifically, in FIG. 1, the detectors are offset from one another by a distance corresponding to three pixels. Thus, when the first detector 130*a* is aligned with pixel #1, the second detector 130*b* is aligned with pixel #4. Furthermore, because of the presence of the holographic element or pixelator 120, when a pulse of light is emitted toward pixel #1, another pulse of light is also emitted toward pixel #4. This means that pixel #1 and pixel #4 can be simultaneously detected by the two detectors 130*a*, 130*b*.

As just discussed above with respect to FIG. 4, there are disadvantages associated with beginning to scan pixel #2 when the scanner 118 is in position for the first detector 130*a* to do so. For the same reasons, there are also disadvantages associated with beginning to scan pixel #5 when the scanner is in position for the second detector 130*b* to do so. This is because of the risk of misidentifying distant targets—beyond the maximum range of the system—located in pixels #1 and #4 as short-range targets located in pixels #2 and #5, respectively. This risk can be alleviated by skipping pixel #2 and pixel #5 at this time (i.e., not emitting laser pulses toward these pixels at this time) and instead waiting until the scanner 118 is in position for the first detector 130*a* to scan pixel #3 and the second detector 130*b* to scan pixel #6. This is illustrated in FIG. 5.

Figure 5:
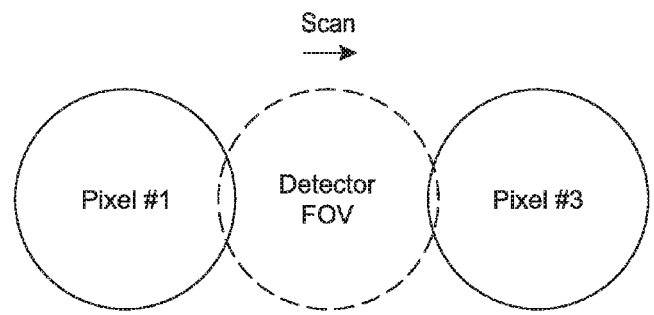
FIG. 5 illustrates the spatial relationship between a downrange pixel and the field of view of the first detector 130a at a scan time which corresponds to a 2× maximum range target in pixel #1.

FIG. 5 illustrates the spatial relationship between a downrange pixel and the field of view of the first detector 130*a* at a scan time which corresponds to a 2× maximum range target in pixel #1. At this scanning position, there is a diminished risk of falsely detecting a target in pixel #1 because such a target would be located at twice the maximum range of the system and a return light pulse would incur a relatively large amount of $1/r^2$ loss associated with that distance. The signal associated with any such return would possibly not rise above the noise floor of the system. (Nevertheless, if the risk of misidentifying the range of a target in a pixel is deemed too great even at a distance of 2× the maximum range of the system, then the first and second detectors 130*a*, 130*b* can instead be separated by a distance which corresponds to 5, 7, 9, etc. pixels.) At the scanning position illustrated in FIG. 5, the first detector 130*a* is in position to begin scanning pixel #3. Though not illustrated, the second detector 130*b* would similarly be in position to begin scanning pixel #6. Thus, the processor 132 can cause the light source 110 to emit a pulse of light at the scanner position. As already discussed herein, the pulse of light is divided by the holographic element or pixelator 120 so as to cause pulses to be sent toward both pixel #3 and pixel #6 at the same time. These pixels are then ranged by the detectors 130*a*, 130*b* (in the same manner illustrated in FIGS. 2-4) as the scanner 118 continues its progress across the field of regard.

Figure 6:
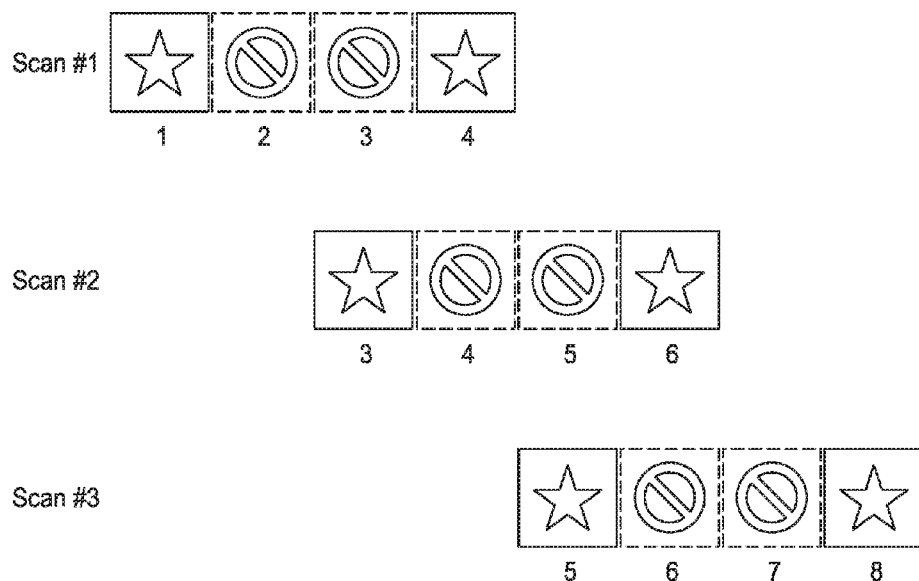
FIG. 6 is a diagram which shows which pixels are detected together during various ranging periods.

FIG. 6 is a diagram which shows which pixels are detected together during various ranging periods. Pixels which are detected in a particular ranging period are indicated in FIG. 6 with stars, while pixels which are not detected during that ranging period are crossed out or are not shown. As already discussed herein, in some embodiments, the first and second detectors 130*a*, 130*b* are spatially separated such that they are in position to simultaneously range/detect pixels which are spaced apart in the scan direction by three pixels. Thus, during the first ranging period, pixels #1 and #4 are detected. During the second ranging period, pixels #3 and #6 are detected. During the third ranging period, pixels #5 and #8 are detected, and so on. In this way, the first detector 130*a* detects odd pixels, while the second detector 130*b* detects even pixels.

Figure 7:
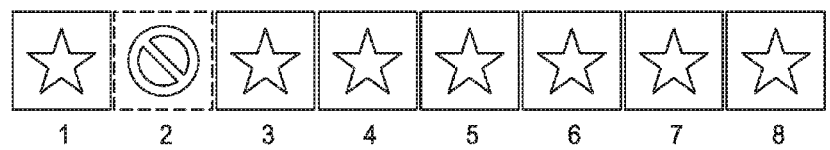
FIG. 7 is a diagram which shows which pixels are detected in each scanning line over time.

FIG. 7 is a diagram which shows which pixels are detected in each scanning line over time. As shown in the diagram, every pixel in the scanning line is detected with the exception of pixel #2. In many applications, this trade-off will be acceptable in order to achieve higher scanning speeds and increased resolution. However, if it is necessary to scan every pixel in the line, then the scanner 118 can be configured to scan one or more additional pixels at the tail end of the line in order to compensate.

Figure 8:
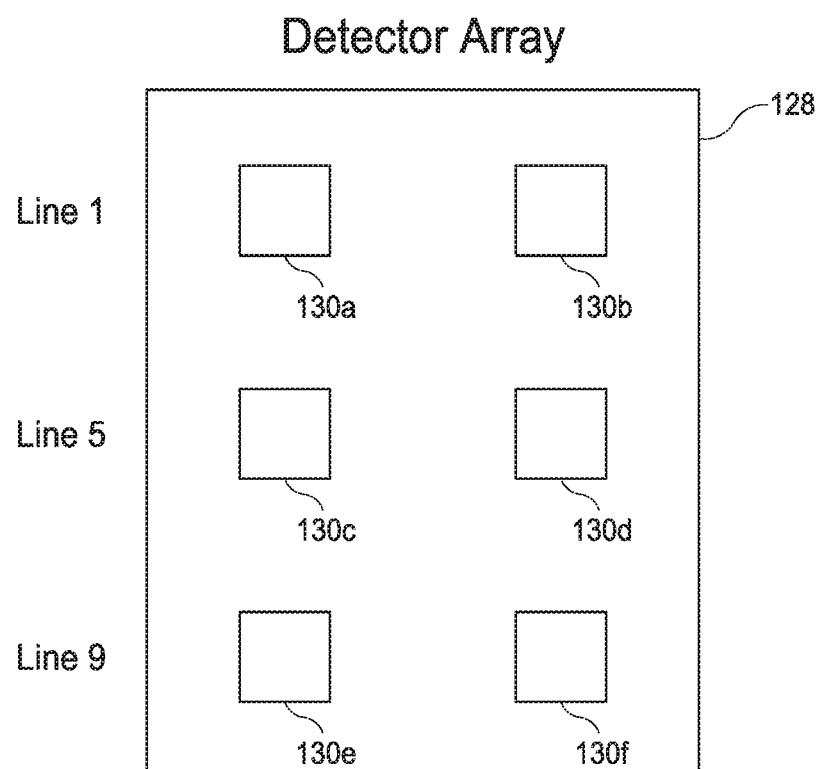
FIG. 8 is a diagram of a detector array 128 which includes detectors 130a-f spaced apart in two dimensions for simultaneously scanning multiple rows in the field of regard.

FIG. 8 is a diagram of a detector array 128 which includes detectors 130*a-f* spaced apart in two dimensions for simultaneously scanning multiple rows in the field of regard. Each row of detectors in the detector array 128 can scan a line in the field of regard at the same time. As illustrated, detectors 130*a* and 130*b* can scan line #1 in the manner already discussed herein. Simultaneously, detectors 130*c* and 130*d* can scan line #5 and detectors 130*e* and 130*f* can scan line #9. By spacing the detectors out in the vertical axis, the scanner can simply reverse direction and move the line of sight down one line to achieve the scan. Otherwise, the scan would be delayed by the time the vertical portion of the scan traverses the number of detector lines before the next scan line(s) are initiated. However, other arrangements and spacings between the detectors in the direction perpendicular to the scanning direction are also possible.

In some embodiments, a lidar system 100 may include a light source 110, a scanner 118, and a detector (e.g., detector 130a). The scanner 118 may be configured to scan a field of view of the light source 110 in a scanning direction across multiple pixels (e.g., pixels #1-#3 illustrated in FIGS. 1-5 or pixels #1-#8 illustrated in FIGS. 6-7) located downrange from the lidar system. The pixels may include pixel #1 and pixel #2, where pixel #2 is located adjacent to pixel #1 along the scanning direction. Pixel #2 being located adjacent to pixel #1 along the scanning direction may indicate that the light-source field of view begins to scan across pixel #1 prior to scanning across pixel #2 (i.e., pixel #1 is scanned before pixel #2). As an example, if the scanning direction is from left to right (e.g., as indicated in FIGS. 2-5), then pixel #2 is located to the right of pixel #1. The scanning direction indicated in FIGS. 2-5 (e.g., from left to right) may be referred to as a forward-scanning direction, and a direction that is substantially opposite the forward-scanning direction (e.g., from right to left) may be referred to as a reverse-scanning direction.

In some embodiments, a pixel may represent or may correspond to a field of view of the light source 110. As the light-source beam propagates away from the light source 110, the diameter of the beam (as well as the size of a corresponding pixel) may increase according to the beam divergence. As an example, if the light source 110 has a divergence of 1 milliradian (mrad), then at a distance of 100 m from the light source 110, the light-source beam may have a size or diameter of approximately 10 cm, and a corresponding pixel may also have a corresponding size or diameter of approximately 10 cm. At a distance of 200 m from the light source 110, the light-source beam and the corresponding pixel may each have a diameter of approximately 20 cm.

In some embodiments, the light source 110 may emit a pulse of light at a time $t_1$, and the scanner 118 may direct the pulse of light toward pixel #2 (e.g., when the pulse is emitted, the light-source field of view may partially, substantially, or completely overlap pixel #2). The scanner 118 may also be configured to scan a field of view of detector 130a across the pixels in the same scanning direction as the light-source field of view is scanned. In some embodiments, the detector 130a field of view may be offset from the light-source field of view in a direction opposite the scanning direction (e.g., the field of view of detector 130a lags behind the light-source field of view). The offset between the detector and light-source fields of view may be such that, at time $t_1$ when the pulse is emitted, the field of view of detector 130a at least partially overlaps pixel #1, and the light-source field of view at least partially overlaps pixel #2 (e.g., the field of view of detector 130a lags behind the light-source field of view by approximately one pixel). As an example, at time $t_1$, the field of view of detector 130a may overlap substantially all (e.g., greater than or equal to 80%) of pixel #1 (e.g., as illustrated in FIG. 4), and the light-source field of view may overlap substantially all (e.g., greater than or equal to 80%) of pixel #2. Additionally, at time $t_1$, the field of view of detector 130a may overlap less than 10% of pixel #2, and the light-source field of view may overlap less than 10% of pixel #1. The detector field of view may be any suitable size relative to the light-source field of view. As an example, the angular size of the detector field of view may be smaller than, substantially the same size as, or larger than the angular size of the light-source field of view.

In some embodiments, detector 130a may be configured to detect a portion of the pulse of light which is scattered by a target located at least partially within pixel #2. The portion of the pulse of light may be detected at any suitable time after $t_1$ when the pulse is emitted (e.g., detector 130a may detect the portion of the pulse at a time $t_2$, where $t_2 > t_1$). In some embodiments, lidar system 100 may include a processor 132 which determines a distance from the lidar system 100 to the target based at least in part on a time of flight of the pulse of light, where the time of flight is $(t_2 - t_1)$. If lidar system 100 measures a time of flight of $\Delta t$ (e.g., $\Delta t$, which equals $t_2 - t_1$, represents the round-trip time for light to travel from the lidar system 100 to a target and back to the lidar system 100), then the distance D from the target to the lidar system 100 may be expressed as $D = c \cdot \Delta t / 2$, where c is the speed of light (approximately $3.0 \times 10^8$ m/s). As an example, if a time of flight is measured to be $\Delta t = 300$ ns, then the distance from the target 122 to the lidar system 100 is approximately D=45.0 m.

If the distance from the lidar system 100 to the target 122 corresponds to a maximum range of the lidar system 100, then a round-trip time corresponding to the maximum range of the lidar system is approximately $(t_2 - t_1)$, and at time $t_2$ (when the detector detects the scattered portion of the emitted pulse) the field of view of detector 130a overlaps substantially all (e.g., greater than or equal to 80%) of pixel #2. The maximum range of lidar system 100 may be any suitable distance, such as for example, 100 m, 200 m, 500 m, or 1 km. As an example, if the maximum range is 200 m, then the time of flight corresponding to the maximum range is approximately $2 \cdot (200 \text{ m})/c \approx 1.33$ μs. In some embodiments, if the target is a close-range target located within 20% of the maximum range of the lidar system 100, then at time $t_2$ (when the detector detects the scattered portion of the emitted pulse) the detector field of view may overlap less than or equal to 20% of pixel #2. In some embodiments, if the target is a midrange target located between 20% and 80% of the maximum range of the lidar system 100, then at time $t_2$ the detector field of view may overlap between 20% and 80% of pixel #2. In some embodiments, if the target is located a distance greater than or equal to 80% of the maximum range of the lidar system 100, then at time $t_2$ the detector field of view may overlap greater than or equal to 80% of pixel #2.

In some embodiments, the field of view of detector 130a and the light-source field of view may have approximately the same scanning speed. As an example, the detector field of view and the light-source field of view may each scan a width of one pixel in a time that is approximately equal to the round-trip time corresponding to the maximum range of the lidar system 100. In some embodiments, the detector field of view being offset from the light-source field of view in the direction opposite the scanning direction may result in the detector field of view being aligned with pixel #2 at a time $t_3$, where $t_3$ is greater than $t_1$, $t_3$ is greater than or equal to $t_2$, and $(t_3 - t_1)$ corresponds to the round-trip time for the maximum range of the lidar system 100. As an example, the light source may emit a pulse of light toward pixel #2 at time $t_1$, and a corresponding return signal from pixel #2 may be received at a subsequent time $t_2$. The detector field of view may be aligned with pixel #2 at time $t_3$, where time $t_3$ occurs after time $t_1$ (e.g., time $t_3 > t_1$), and the time $(t_3 - t_1)$ corresponds to the round-trip time for the maximum range of the lidar system 100. If the return signal from pixel #2 includes scattered light from a target located at the maximum range, then $t_3$ may be approximately equal to $t_2$ (e.g., the light is received at approximately the same time as the detector field of view is aligned with pixel #2). Otherwise, if the return signal from pixel #2 originates from a target located closer than the maximum range, then $t_3$ is greater than $t_2$ (e.g., the light is received at time $t_2$ before the detector field of view is substantially aligned with pixel #2 at time $t_3$).

In some embodiments, after emitting a pulse of light at a time $t_1$, the light source 110 may be configured to emit another pulse of light at a time $t_4$. The subsequent pulse of light may be emitted at a time when the detector field of view is aligned with pixel #2 or at a subsequent time. The detector field of view may be aligned with pixel #2 at a time $t_3$, where $(t_3-t_1)$ corresponds to the round-trip time for the maximum range of the lidar system 100, and the light source 110 may emit the subsequent pulse of light at time $t_4$, where $t_4$ is greater than or equal to $t_3$. Additionally, the pixels may include pixel #3 located adjacent to pixel #2 along the scanning direction, and at time $t_4$ when the pulse is emitted, the field of view of the light source 110 may be aligned to direct the pulse toward pixel #3.

Figure 9:
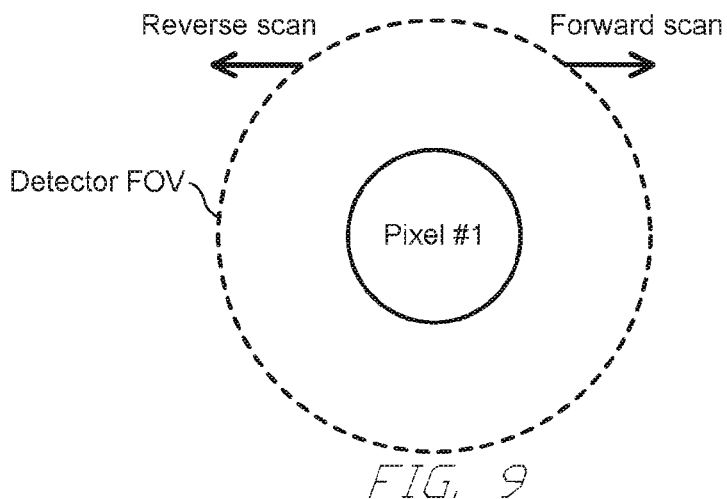
FIG. 9 illustrates the spatial relationship between a downrange pixel and the field of view of a detector, where the detector field of view is larger than the pixel.

FIG. 9 illustrates the spatial relationship between a down-range pixel and the field of view of a detector, where the detector field of view (FOV) is larger than the pixel. In some embodiments, the angular size of a detector field of view may be greater than the angular size of the light-source field of view. As an example, a detector field of view may be approximately 1.5×, 2×, 3×, 4×, 5×, or 10× larger than the size of a pixel (which corresponds to the field of view of light source 110). In FIG. 9, the detector FOV is approximately 2.5 times larger than pixel #1 (e.g., the diameter of the detector FOV is approximately 2.5 times the diameter of pixel #1). As another example, the divergence of the detector FOV may be approximately 1.5×, 2×, 3×, 4×, 5×, or 10× larger than the divergence of the light-source FOV. If the detector FOV has a 3-mrad divergence and the light-source FOV has a 1-mrad divergence, then at any particular distance from the light source 110, the detector FOV is 3 times larger than the light-source FOV. For example, at a distance of 100 m from the light source 110, the light-source beam (which corresponds to pixel #1) may have a diameter of approximately 10 cm, and the detector FOV may have a diameter of approximately 30 cm. At a distance of 200 m, the light-source beam may have a diameter of approximately 20 cm, and the detector FOV may have a diameter of approximately 60 cm.

In some embodiments, a lidar system 100 may perform a series of forward and reverse scans. As an example, a forward scan may include the detector FOV being scanned horizontally from left to right, and a reverse scan may include the detector being scanned from right to left, or vice versa. As another example, a forward scan may include the detector FOV being scanned vertically (e.g., scanning upward or downward), and a reverse scan may include the detector FOV being scanned in the opposite direction. As another example, a forward scan may include the detector FOV begin scanned along any suitable direction (e.g., along a 45-degree angle), and a reverse scan may include the detector FOV being scanned along a substantially opposite direction.

As illustrated in FIG. 9, the detector FOV may be scanned along a left-to-right direction during a forward scan, and the detector FOV may be scanned along a right-to-left direction during a reverse scan. In some embodiments, the forward and reverse scans may trace paths that are adjacent to or displaced with respect to one another. As an example, a reverse scan may follow a line in the field of regard that is displaced above, below, to the left of, or to the right of a previous forward scan. As another example, a reverse scan may scan a row in the field of regard that is displaced below a previous forward scan, and the next forward scan may be displaced below the reverse scan. The forward and reverse scans may continue in an alternating manner with each scan being displaced with respect to the previous scan until a complete field of regard has been covered. Scans may be displaced with respect to one another by any suitable angular amount, such as for example, by approximately 0.05°, 0.1°, 0.2°, 0.5°, 1°, or 2°.

In some embodiments, a lidar system 100 may be configured so that the detector FOV is larger than the light-source FOV, and the detector and light-source FOVs are substantially coincident or overlapped. The light source 110 may emit a pulse of light toward pixel #1 (e.g., when the pulse is emitted, the light-source FOV may partially, substantially, or completely overlap pixel #1). The FOV of a detector may be larger than the light-source FOV, and when the pulse of light is emitted toward pixel #1, the detector FOV may contain and may be approximately centered on pixel #1. As illustrated in FIG. 9, the detector FOV may not have any substantial offset with respect to the light-source FOV, and as the pulse of light propagates to and from a target, the detector FOV scans to the right during a forward scan and to the left during a reverse scan. The size of the pixel #1 and the detector FOV may be configured so that during a forward or reverse scan, the detector FOV may substantially contain pixel #1 at least until a round-trip time corresponding to the maximum range of the lidar system has elapsed. When the round-trip time corresponding to the maximum range of the lidar system has elapsed, the detector FOV may have moved so that the pixel #1 is located at or near the left or right edge of the detector FOV. For example, during a forward scan, after the round-trip time corresponding to the maximum range has elapsed, the left edge of pixel #1 may be substantially coincident with the left edge of the detector FOV.

Figure 10:
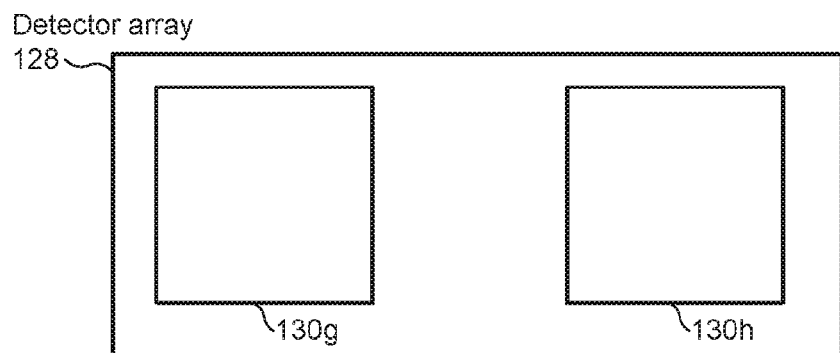
FIG. 10 is a diagram of a detector array which includes two detectors.

FIG. 10 is a diagram of a detector array 128 which includes two detectors 130*g*, 130*h*. In some embodiments, a lidar system 100 may include a detector array 128 with a first detector 130*g* and a second detector 130*h*. As an example, each of the detectors 130*g* and 130*h* may be an avalanche photodiode (APD) or a single-photon avalanche diode (SPAD). As another example, each of the detectors 130*g* and 130*h* may be a PN photodiode (e.g., a photodiode structure formed by a p-type semiconductor and a n-type semiconductor) or a PIN photodiode (e.g., a photodiode structure formed by an undoped intrinsic semiconductor region located between p-type and n-type regions). The detectors 130*g*, 130*h* may each have an active region or an avalanche-multiplication region that includes silicon, germanium, or InGaAs. The active region or avalanche-multiplication region may have any suitable size, such as for example, a diameter or width of approximately 50-500 µm.

Figure 11:
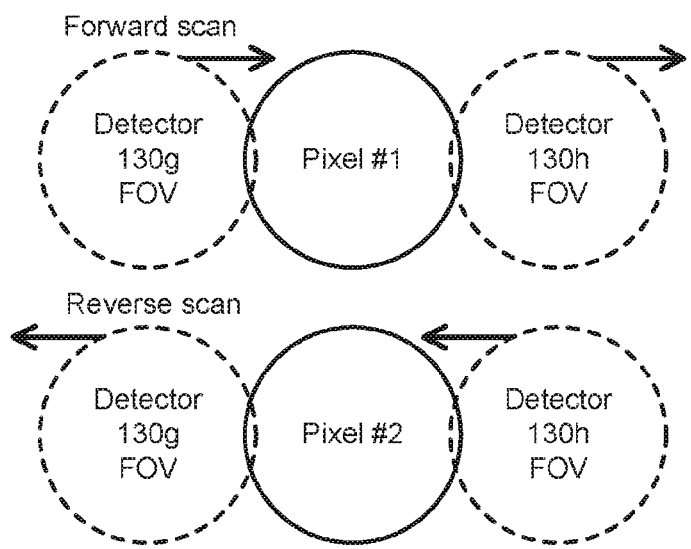
FIG. 11 illustrates forward and reverse scans based on the detector array in FIG. 10.

FIG. 11 illustrates forward and reverse scans based on the detector array in FIG. 10. In some embodiments, a lidar system 100 may include a light source 110, a scanner 118, and a detector array 128 with two detectors 130*g*, 130*h*. The two detectors 130*g* and 130*h* may be offset from one another along a direction corresponding to the light-source scanning direction, and the field of view of the light source 110 may be located between the FOVs of detectors 130*g* and 130*h*. The scanner 118 may be configured to scan the light-source FOV (as well as the FOVs of detectors 130*g* and 130*h*) in a forward-scanning direction and in a reverse-scanning direction across multiple pixels located downrange from the lidar system. As an example, the scanner 118 may scan the light-source FOV (and the detector FOVs) along the forward-scanning direction, and then the scanner 118 may reverse direction and make a subsequent scan along the reverse-scanning direction. As discussed herein, forward and reverse scans may trace paths that are adjacent to or displaced with respect to one another. The forward and reverse scans may be performed alternately with each reverse scan displaced with respect to the previous forward scan, and each forward scan displaced with respect to the previous reverse scan. As an example, a forward scan may follow a substantially horizontal path, and for the subsequent reverse scan, the scanner 118 may deflect the light-source FOV (as well as the FOVs of detectors 130g and 130h) vertically by some angle (e.g., 0.5°).

In FIG. 11, the forward scan traces across pixel #1 horizontally from left to right, and the reverse scan traces from right to left across pixel #2, which is located below pixel #1. In some embodiments, the field of view of detector 130g may be offset from the light-source field of view in a direction opposite the forward-scanning direction (which corresponds to the reverse-scanning direction), and the field of view of detector 130h may be offset from the light-source field of view in the forward-scanning direction. In the forward scan illustrated in FIG. 11, the FOV of detector 130h leads the light-source FOV (corresponding to pixel #1), and the FOV of detector 130g lags behind the light-source FOV. In the reverse scan, the relative orientation of the detectors is interchanged so that the FOV of detector 130g leads the light-source FOV (corresponding to pixel #2), and the FOV of detector 130h lags behind the light-source FOV. In some embodiments, during a forward scan, the lidar system 100 may use a signal from detector 130g to determine a distance to a target, and during a reverse scan, the lidar system 100 may use a signal from detector 130h to determine a distance to a target. In some embodiments, a signal generated by detector 130h may be disregarded during a forward scan, and a signal generated by detector 130g may be disregarded during a reverse scan.

In some embodiments, during a forward scan, the light source 110 may emit a pulse of light, and the scanner 118 may direct the pulse of light toward pixel #1. When the pulse is emitted, the FOVs of detector 130g and 130h may each overlap less than or equal to 20% of pixel #1. The scanner 118 may scan the FOVs of detector 130g and 130h along the forward-scanning direction (e.g., left to right in FIG. 11), and detector 130g may detect a portion of the pulse of light which is scattered by a target located downrange from the lidar system 100. As time progresses, the overlap of detector 130h FOV with pixel #1 may decrease until there is no overlap, and the overlap of detector 130g FOV with pixel #1 may increase until it reaches a maximum overlap (e.g., greater than or equal to 80% overlap). The maximum overlap between detector 130g FOV and pixel #1 may occur at a time that corresponds to the maximum range of the lidar system, and after that, the overlap between detector 130g FOV and pixel #1 may decrease as the forward scan continues.

In some embodiments, during a reverse scan, the light source 110 may emit another pulse of light, and the scanner 118 may direct the pulse of light toward pixel #2. When the pulse is emitted, the FOVs of detector 130g and 130h may each overlap less than or equal to 20% of pixel #2. The scanner 118 may scan the FOVs of detector 130g and 130h along the reverse-scanning direction (e.g., right to left in FIG. 11), and detector 130h may detect a portion of the pulse of light which is scattered by a target located downrange from the lidar system 100. As time progresses, the overlap of detector 130g FOV with pixel #2 may decrease until there is no overlap, and the overlap of detector 130h FOV with pixel #2 may increase until it reaches a maximum overlap (e.g., greater than or equal to 80% overlap). The maximum overlap between detector 130h FOV and pixel #2 may occur at a time that corresponds to the maximum range of the lidar system, and after that, the overlap between detector 130h FOV and pixel #2 may decrease as the reverse scan continues.

In some embodiments, a detector array 128 may include two detectors (e.g., a first detector and a second detector), where the first detector is used to detect scattered light during a forward scan, and the second detector is used to detect scattered light during a reverse scan. The lidar system 100 may include an optical element configured to direct scattered light to the first detector during the forward scan and to direct scattered light to the second detector during the reverse scan. As an example, the scanner 118 may be used to apply a first amount of fixed deflection or angular offset during a forward scan so that scattered light from an emitted pulse is directed to the first detector. Similarly, the scanner 118 may apply a second amount of deflection or angular offset during a reverse scan so that scattered light is directed to the second detector. As another example, the lidar system 100 may include an additional deflection mirror or a deflecting element (e.g., a wedged optic) that has two deflection states for directing scattered light to the first or second detector during a forward or reverse scan, respectively. In some embodiments, a lidar system may include one detector configured to detect scattered light during both forward and reverse scans. The lidar system 100 may include an optical element that provides two states for the orientation of the detector FOV. During a forward scan, the detector FOV may be oriented so that it lags the light source FOV and detects scattered light from emitted pulses, and during a reverse scan, the detector FOV may be oriented so that it also lags the light source FOV.

In some embodiments, a lidar system 100 may include a light source 110, a splitter 120, a scanner 118, and a detector array 128. The light source 110 may emit pulses of light, and the splitter 120 may split each emitted pulse of light into two or more pulses of angularly separated light. The pulses may be separated by any suitable angle Θ, such as for example, 1 mrad, 2 mrad, 5 mrad, 10 mrad, 20 mrad, or 50 mrad. The scanner 118 may scan pulses of light, which are emitted by the light source 110 and split by the splitter 120, along a scanning direction across pixels located downrange from the lidar system 100. The detector array 128 may include two or more detectors. As an example, the splitter 120 may split an emitted pulse into two pulses of angularly separated light (e.g., a first pulse and a second pulse), and the detector array 128 may include a first detector 130a and a second detector 130b. The first and second detectors may be separated by a detector-separation distance along a direction corresponding to the scanning direction of the light pulses. The first detector may be configured to detect scattered light from the first pulse of light, and the second detector may be configured to detect scattered light from the second pulse of light. In some embodiments, the lidar system 100 may also include a processor configured to determine one or more distances to one or more targets based at least in part on a time of flight of the first pulse of light or a time of flight of the second pulse of light.

In some embodiments, the splitter 120 may include a holographic optical element, a diffractive optical element, a polarizing beam splitter, a non-polarizing beam splitter, or a beam splitter with a metallic or dielectric coating. As an example, the splitter 120 may include a beam splitter that is manufactured using a holographic process, or the splitter 120 may include a diffractive beam splitter. As another example, the splitter 120 may include a holographic element or a diffractive element that divides an input beam into two or more output beams. In some embodiments, the splitter 120 may be positioned after the scanner 118 so that the splitter 120 receives the emitted pulses of light from the scanner 118. As illustrated in FIG. 1, the scanner 118 receives pulses of light emitted by the light source 110, and the splitter 120 is positioned after the scanner 118 to receive the pulses from the scanner 118. In some embodiments, the scanner 118 may be positioned after the splitter 120 so that the splitter 120 receives pulses of light emitted by the light source 110, and the scanner 118 receives pulses of light after they are split by the splitter 120.

In some embodiments, the splitter 120 may be configured to split a pulse of light substantially equally into two pulses. As an example, the splitter 120 may receive one pulse of light and split it into a first pulse and a second pulse, where the first and second pulses each have approximately one-half of the energy or peak power of the received pulse of light. In some embodiments, the splitter 120 may be configured to split a pulse of light into three pulses of angularly separated light (e.g., a first pulse, a second pulse, and a third pulse). Additionally, the detector array may include three detectors (e.g., a first detector, a second detector, and a third detector), where each detector is configured to receive and detect light from one of the respective pulses of light (e.g., the first detector detects light from the first pulse). In some embodiments, the angularly separated pulses of light from the splitter 120 may be split along a direction corresponding to the scanning direction. As an example, if the scanning direction is substantially horizontal, the angularly separated pulses of light may also be split along the same horizontal direction.

In some embodiments, the light source 110 may emit a pulse of light at a time $t_1$, and the splitter 120 may split the pulse into two pulses (e.g., a first pulse and a second pulse). The scanner 118 may scan a first light-source field of view associated with the first pulse and a second light-source field of view associated with the second pulse along the scanning direction and across the pixels located downrange from the lidar system 100. The pixels may include pixel #1, pixel #2, pixel #3, pixel #4, and pixel #5 positioned in order along the scanning direction (e.g., the first or second light-source field of view may scan across the pixels and encounter the pixels in the following order: pixel #1, pixel #2, pixel #3, pixel #4, and pixel #5). In some embodiments, the scanner 118 may direct the first pulse of light toward pixel #2 and the second pulse of light toward pixel #5. Additionally, the scanner 118 may scan a field of view of the first detector and a field of view of the second detector along the scanning direction across the pixels. The first-detector field of view may be offset from the first light-source field of view in a direction opposite the scanning direction, where, at time $t_1$, the first-detector field of view at least partially overlaps the first pixel, and the first light-source field of view at least partially overlaps the second pixel. Similarly, the second detector field of view may be offset from the second light-source field of view in a direction opposite the scanning direction, where, at time $t_1$, the second detector field of view at least partially overlaps the fourth pixel, and the second light-source field of view at least partially overlaps the fifth pixel.

In some embodiments, the separation distance between the first and second pulses of light at the maximum range of the lidar system 100 may correspond to the separation distance between detectors 130a and 130b. As an example, when the first and second pulses of light are incident on a target located at the maximum range of the lidar system 100, the first and second pulses of light may be separated by a distance that corresponds to the detector-separation distance. When the first and second pulses of light are emitted, their fields of view may overlap pixels #2 and #5, respectively. When the first and second pulses of light return to the lidar system 100 after scattering from the target, the first-detector field of view may overlap pixel #2, and the second detector field of view may overlap pixel #5. In some embodiments, the separation distance between the first and second pulses of light at the maximum range of the lidar system 100 may correspond to an odd number of pixels greater than or equal to three pixels. As an example, at the maximum range, the first and second pulses of light may be separated by a distance corresponding to three pixels so that when the first pulse is directed at pixel #2, the second pulse is directed at pixel #5. In some embodiments, the detector-separation distance may correspond to an odd number of pixels greater than or equal to three pixels. As an example, the detector-separation distance may correspond to three pixels so that when the first detector receives light from pixel #2, the second detector receives light from pixel #5.

Figure 12:
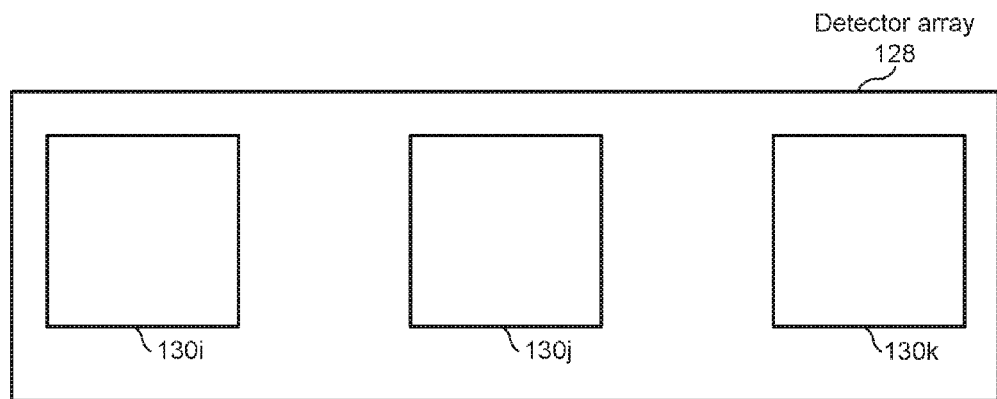
FIG. 12 is a diagram of a detector array which includes three detectors.

FIG. 12 is a diagram of a detector array 128 which includes three detectors 130i, 130j, and 130k. Each of the detectors 130i, 130j, and 130k may be an APD or a SPAD. In some embodiments, a lidar system 100 may include a light source 110, a scanner 118, a splitter 120, and a detector array 128 with three detectors 130i, 130j, and 130k. The three detectors 130i, 130j, 130k may be separated from one another by a detector-separation distance along a direction corresponding to the light-source scanning direction.

Figure 13:
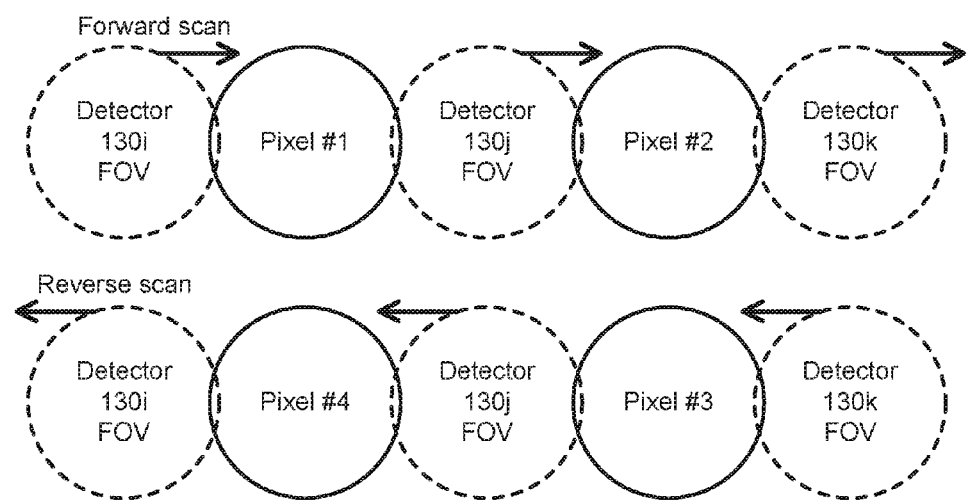
FIG. 13 illustrates forward and reverse scans based on the detector array in FIG. 12.

FIG. 13 illustrates forward and reverse scans based on the detector array in FIG. 12. During a forward scan, the splitter 120 may split an emitted pulse into two pulses of angularly separated light (e.g., a first pulse and a second pulse which are directed to pixel #1 and pixel #2, respectively). When the pulse is emitted, the field of view of the first pulse (corresponding to pixel #1) may be located between the FOVs of detectors 130i and 130j, and the field of view of the second pulse (corresponding to pixel #2) may be located between the FOVs of detectors 130j and 130k. The detector 130i FOV may lag the FOV of the first pulse, and detector 130i may be configured to detect scattered light from the first pulse. Similarly, the detector 130j FOV may lag the FOV of the second pulse, and detector 130j may be configured to detect scattered light from the second pulse. Additionally, during a forward scan, the signal from detector 130k may be ignored. In some embodiments, there may be additional pixels (not illustrated in FIG. 13) located between pixels #1 and #2 (and additional pixels located between pixels #3 and #4).

In some embodiments, the scanner 118 may be configured to scan additional pulses of light, which are emitted by the light source 110 and split by the splitter 120, along a reverse-scanning direction corresponding to the direction opposite the forward-scanning direction. The light source 110 may emit an additional pulse of light while the scanner 118 is scanning in the reverse-scanning direction. As discussed herein, scans of the reverse-scanning direction may be displaced with respect to the forward-scanning direction. In FIG. 13, the forward scan traces across pixels #1 and #2, and the reverse scan traces across pixels #3 and #4, which are located below pixels #1 and #2. The splitter 120 may split the emitted pulse into a third pulse of light and a fourth pulse of light, which are angularly separated. The third pulse may be directed to pixel #3, and the fourth pulse may be directed to pixel #4. When the pulse is emitted, the field of view of the third pulse (corresponding to pixel #3) may be located between the FOVs of detectors 130$j$ and 130$k$, and the field of view of the second pulse (corresponding to pixel #4) may be located between the FOVs of detectors 130$i$ and 130$j$. During a reverse scan, the detector 130$k$ FOV may lag the FOV of the third pulse, and detector 130$k$ may be configured to detect scattered light from the third pulse. Similarly, the detector 130$j$ FOV may lag the FOV of the fourth pulse, and detector 130$j$ may be configured to detect scattered light from the fourth pulse. Additionally, during a reverse scan, the signal from detector 130$i$ may be ignored.

A lidar system 100 as described or illustrated herein may also include various elements described or illustrated in U.S. Provisional Patent Application No. 62/243,633, filed 19 Oct. 2015 and entitled "Lidar System with Improved Signal-to-Noise Ratio in the Presence of Solar Background Noise" or U.S. Provisional Patent Application No. 62/261,214, filed 30 Nov. 2015 and entitled "Lidar System with a Distributed Laser and a Plurality of Sensor Heads," each of which is incorporated herein by reference.

Figure 14:
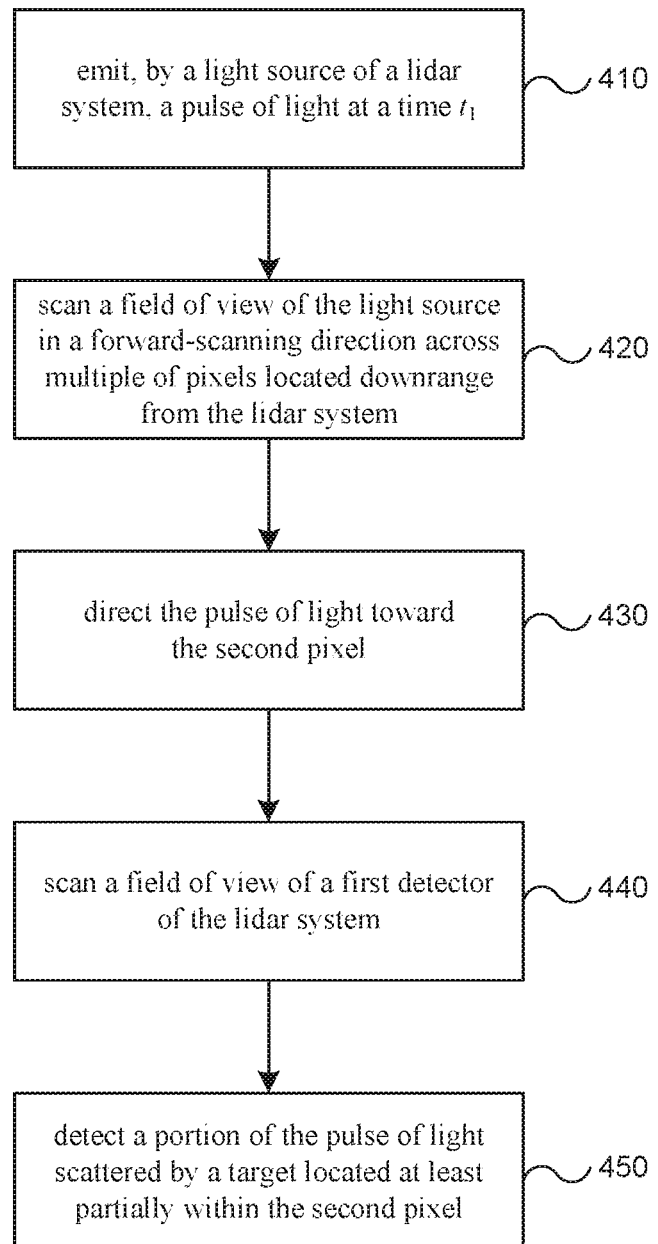
FIG. 14 illustrates an example method for detecting light scattered by a target.

FIG. 14 illustrates an example method 400 for detecting light scattered by a target. The method may begin at step 410, where a light source 110 of a lidar system 100 emits a pulse of light at a time $t_1$. At step 420, a field of view of the light source 110 may be scanned in a forward-scanning direction across multiple pixels located downrange from the lidar system 100. The pixels may include a first pixel and a second pixel, where the second pixel is located adjacent to the first pixel along the forward-scanning direction. At step 430, the pulse of light may be directed toward the second pixel. At step 440, a field of view of a first detector of the lidar system 100 may be scanned. The first-detector field of view may be scanned in the forward-scanning direction across the pixels. Additionally, the first-detector field of view may be offset from the light-source field of view in a direction opposite the forward-scanning direction, where, at time $t_1$, the first-detector field of view at least partially overlaps the first pixel, and the light-source field of view at least partially overlaps the second pixel. At step 450, a portion of the pulse of light scattered by a target located at least partially within the second pixel may be detected, at which point the method may end. The portion of the pulse of light may be detected at a time $t_2$, where $t_2$ is greater than $t_1$.

Figure 15:
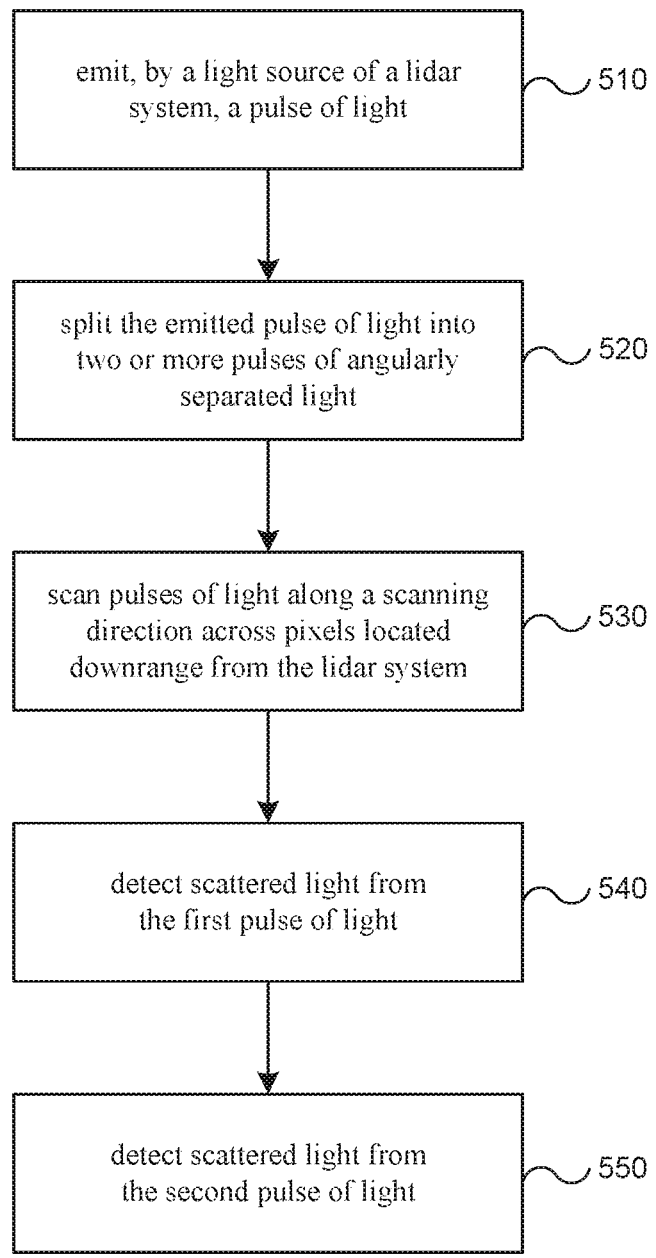
FIG. 15 illustrates an example method for detecting scattered light from angularly separated pulses of light.

FIG. 15 illustrates an example method 500 for detecting scattered light from angularly separated pulses of light. The method may begin at step 510, where a light source 110 of a lidar system 100 emits a pulse of light. At step 520, the emitted pulse of light may be split into two or more pulses of angularly separated light. The two or more pulses may be split by a splitter 120 and may include a first pulse of light and a second pulse of light. At step 530, pulses of light (which are emitted by the light source 110 and split by the splitter 120) may be scanned along a scanning direction across pixels located downrange from the lidar system 100. At step 540, scattered light from the first pulse of light may be detected. At step 550, scattered light from the second pulse of light may be detected, at which point the method may end. The scattered light from the first and second pulses of light may be detected by a first detector and a second detector, respectively, where the first and second detectors are part of a detector array. The first and second detectors may be separated by a detector-separation distance along a direction corresponding to the scanning direction of the light pulses.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented, at least in part, using computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

What is claimed is:

1. A lidar system comprising:
a light source configured to emit a pulse of light;
a scanner configured to:
scan a field of view of the light source in a forward-scanning direction across a plurality of pixels located downrange from the lidar system, wherein the plurality of pixels comprises a first pixel and a second pixel, wherein the second pixel is located adjacent to the first pixel along the forward-scanning direction;
direct the pulse of light toward the second pixel; and
scan a field of view of a first detector of the lidar system, wherein:
the first-detector field of view is scanned in the forward-scanning direction across the plurality of pixels; and
the first-detector field of view is offset from the light-source field of view in a direction opposite the forward-scanning direction, wherein, when the pulse is emitted:
the first-detector field of view at least partially overlaps the first pixel; and
the light-source field of view at least partially overlaps the second pixel; and
the first detector, wherein the first detector is configured to detect a portion of the pulse of light scattered by a target located at least partially within the second pixel.

2. The lidar system of claim 1, further comprising a processor configured to determine a distance from the lidar system to the target based at least in part on a time of flight of the pulse of light.

3. The lidar system of claim 1, wherein if the distance from the lidar system to the target corresponds to a maximum range of the lidar system, then, when the first detector detects the portion of the pulse of light, the first-detector field of view overlaps substantially all of the second pixel.

4. The lidar system of claim 1, wherein if the target is a close-range target located within 20% of a maximum range of the lidar system, then, when the first detector detects the portion of the pulse of light, the first-detector field of view overlaps less than or equal to 20% of the second pixel.

5. The lidar system of claim 1, wherein if the target is a midrange target located between 20% and 80% of a maximum range of the lidar system, then, when the first detector detects the portion of the pulse of light, the first-detector field of view overlaps between 20% and 80% of the second pixel.

6. The lidar system of claim 1, wherein if the target is located a distance greater than or equal to 80% of a maximum range of the lidar system, then, when the first detector detects the portion of the pulse of light, the first-detector field of view overlaps greater than or equal to 80% of the second pixel.

7. The lidar system of claim 1, wherein an angular size of the first-detector field of view is substantially equal to an angular size of the light-source field of view.

8. The lidar system of claim 1, wherein the second pixel being located adjacent to the first pixel along the forward-scanning direction corresponds to the light-source field of view beginning to scan across the first pixel prior to scanning across the second pixel.

9. The lidar system of claim 1, wherein a time for the first detector field of view to scan a width of one pixel is approximately equal to a round-trip time for a maximum range of the lidar system.

10. The lidar system of claim 1, wherein a time for the light-source field of view to scan a width of one pixel is approximately equal to a round-trip time for a maximum range of the lidar system.

11. The lidar system of claim 1, wherein the first-detector field of view being offset from the light-source field of view in the direction opposite the forward-scanning direction is such that the first-detector field of view is aligned with the second pixel at a time after the pulse of light is emitted that corresponds to a round-trip time for a maximum range of the lidar system.

12. The lidar system of claim 1, wherein:
the first-detector field of view is aligned with the second pixel at a time after the pulse of light is emitted that corresponds to a round-trip time for a maximum range of the lidar system; and
the light source is further configured to emit another pulse of light at a time after the first-detector field of view is aligned with the second pixel.

13. The lidar system of claim 1, further comprising a second detector, wherein a field of view of the second detector is offset from the light-source field of view in the forward-scanning direction.

14. The lidar system of claim 13, wherein, when the pulse is emitted, the second-detector field of view overlaps less than or equal to 20% of the second pixel.

15. The lidar system of claim 13, wherein the scanner is further configured to:
scan the light-source field of view in a reverse-scanning direction corresponding to the direction opposite the forward-scanning direction; and
scan the second-detector field of view in the reverse-scanning direction.

16. The lidar system of claim 15, wherein:
the light source is further configured to emit an additional pulse of light while the scanner is scanning the light-source field of view and the second-detector field of view in the reverse-scanning direction; and
the second detector is configured to detect a portion of the additional pulse of light which is scattered by a target located downrange from the lidar system.

17. The lidar system of claim 15, wherein:
the forward-scanning direction corresponds approximately to a left-to-right direction; and
the reverse-scanning direction corresponds approximately to a right-to-left direction.

18. A method comprising:
emitting, by a light source of a lidar system, a pulse of light;
scanning a field of view of the light source in a forward-scanning direction across a plurality of pixels located downrange from the lidar system, wherein the plurality of pixels comprises a first pixel and a second pixel, wherein the second pixel is located adjacent to the first pixel along the forward-scanning direction;
directing the pulse of light toward the second pixel;
scanning a field of view of a first detector of the lidar system, wherein:
the first-detector field of view is scanned in the forward-scanning direction across the plurality of pixels; and
the first-detector field of view is offset from the light-source field of view in a direction opposite the forward-scanning direction, wherein, when the pulse is emitted:
the first-detector field of view at least partially overlaps the first pixel; and
the light-source field of view at least partially overlaps the second pixel; and
detecting a portion of the pulse of light scattered by a target located at least partially within the second pixel.

19. The method of claim 18, further comprising determining a distance from the lidar system to the target based at least in part on a time of flight of the pulse of light.

20. The method of claim 18, further comprising:
scanning the light-source field of view in a reverse-scanning direction corresponding to the direction opposite the forward-scanning direction;
scanning a field of view of a second detector of the lidar system in the reverse-scanning direction, wherein the second-detector field of view is offset from the light-source field of view in the forward-scanning direction.

* * * * *

UNITED STATES PATENT AND TRADEMARK OFFICE
CERTIFICATE OF CORRECTION

| | |
|---|---|
| PATENT NO. | : 9,841,495 B2 |
| APPLICATION NO. | : 15/342595 |
| DATED | : December 12, 2017 |
| INVENTOR(S) | : Scott R. Campbell et al. |

It is certified that error appears in the above-identified patent and that said Letters Patent is hereby corrected as shown below:

In the Claims

In Column 16 at Line 53, in Claim 1, change "forward-" to --first--.

In Column 16 at Line 58, in Claim 1, change "forward-" to --first--.

In Column 16 at Line 63, in Claim 1, change "forward-" to --first--.

In Column 16 at Line 67, in Claim 1, change "forward-" to --first--.

In Column 17 at Line 39, in Claim 8, change "forward-" to --first--.

In Column 17 at Line 53, in Claim 11, change "forward-" to --first--.

In Column 18 at Line 4, in Claim 13, change "forward-" to --first--.

In Column 18 at Line 10 (approx.), in Claim 15, change "reverse-" to --second--.

In Column 18 at Line 12 (approx.), in Claim 15, change "forward-" to --first--.

In Column 18 at Line 13 (approx.), in Claim 15, change "reverse-" to --second--.

In Column 18 at Line 19 (approx.), in Claim 16, change "reverse-" to --second--.

In Column 18 at Line 25 (approx.), in Claim 17, change "forward-" to --first--.

In Column 18 at Line 26 (approx.), in Claim 17, change "direction;" to --direction from the perspective of the scanner;--.

In Column 18 at Line 27 (approx.), in Claim 17, change "reverse-" to --second--.

Signed and Sealed this
Seventeenth Day of April, 2018

Andrei Iancu
*Director of the United States Patent and Trademark Office*

CERTIFICATE OF CORRECTION (continued)
U.S. Pat. No. 9,841,495 B2

In Column 18 at Line 28 (approx.), in Claim 17, change "direction." to --direction from the perspective of the scanner.--.

In Column 18 at Line 32, in Claim 18, change "forward-" to --first--.

In Column 18 at Line 37, in Claim 18, change "forward-" to --first--.

In Column 18 at Lines 41-42, in Claim 18, change "forward-" to --first--.

In Column 18 at Line 46, in Claim 18, change "forward-" to --first--.

In Column 18 at Line 58 (approx.), in Claim 20, change "reverse-" to --second--.

In Column 18 at Line 60 (approx.), in Claim 20, change "forward-" to --first--.

In Column 18 at Line 62 (approx.), in Claim 20, change "reverse-" to --second--.

In Column 18 at Line 64 (approx.), in Claim 20, change "forward-" to --first--.